United States Patent [19]
Maru

[11] Patent Number: 6,088,382
[45] Date of Patent: Jul. 11, 2000

[54] CELL SEARCH CIRCUIT FOR CDMA

[75] Inventor: Tsuguo Maru, Tokyo, Japan

[73] Assignee: NEC Corporation, Tokyo, Japan

[21] Appl. No.: 08/980,531

[22] Filed: Dec. 1, 1997

[30] Foreign Application Priority Data

Nov. 29, 1996 [JP] Japan ................................. 8-334975

[51] Int. Cl.⁷ ................................................ H04B 1/707
[52] U.S. Cl. ...................... 375/142; 375/142; 375/144; 375/150; 375/148
[58] Field of Search .................................. 370/335, 342, 370/203, 206, 441, 479; 375/140, 141, 142, 144, 150, 147, 148

[56] References Cited

U.S. PATENT DOCUMENTS

| | | |
|---|---|---|
| 4,291,410 | 9/1981 | Caples et al. . |
| 5,910,948 | 6/1999 | Shou et al. ............................. 375/150 |
| 5,982,810 | 11/1999 | Nishimori ............................. 375/150 |
| 5,995,538 | 11/1999 | Lomp ..................................... 375/143 |

*Primary Examiner*—Chi H. Pham
*Assistant Examiner*—Brenda H. Pham
*Attorney, Agent, or Firm*—Ostrolenk, Faber, Gerb & Soffen, LLP

[57] ABSTRACT

A cell search circuit which does not invite an increase in search time, even if coherent integration is performed, and which minimizes an increase in the scale of the circuitry. The circuit comprises a spread signal generator having a phase shifting function, a multiplier for multiplying an output of the spread signal generator by an input signal, a ring buffer accumulating results of correlation, performed a number of times, in order to perform coherent integration over a plurality of signals, and an accumulator constructed by a single-signal portion of the ring buffer and an adder. Integration is performed over a length of time the same as unit-signal duration prior to spreading, coherent integration is performed by summing results of time integration of each signal, which results have been accumulated in the ring buffer, and the shifting operation of the spread signal generator is controlled based upon results of coherent integration.

5 Claims, 5 Drawing Sheets

CELL SEARCH CIRCUIT FOR CDMA

FIELD OF THE INVENTION

This invention relates to a search circuit used in CDMA (code division multiple access) communication in which the power of an interference component is larger than the power of a target signal component. More particularly, the invention relates to a circuit which conducts a search while improving the S/N (signal-to-noise) ratio by performing coherent integration over a plurality of signals.

BACKGROUND

A search circuit for achieving synchronization in spread spectrum communications is constructed as set forth below. For example, in a case where a correlator is used for despreading, the correlator multiplies an input signal by a spreading code prepared internally of the search circuit and is capable of obtaining the signal that prevailed prior to spreading by integration over a length of time substantially the same as the duration of the unit signal prior to spreading. In a case where the spreading code prepared within the search circuit is not synchronized to the spreading code of the transmitting party, the integrated output becomes almost zero.

Accordingly, until the desired signal level is obtained by shifting the phase of a spread signal oscillator in the search circuit a fixed amount, this repetitive operation is repeated to achieve synchronization of the spread signals. A circuit which performs synchronization of spread signals by such method is referred to as a "sliding correlator".

SUMMARY OF THE DISCLOSURE

Toward the present invention the following problems have been encountered.

However, in a case where the power of an interference component is large in comparison with the power of the target signal component, as in CDMA (code division multiple access), there are many instances in which the desired S/N ratio cannot be achieved merely by performing integration over a length of time substantially the same as the duration of the unit signal prior to spreading.

In such case it might be considered to raise the S/N ratio and conduct the search by performing coherent integration over a plurality of signals.

To implement this, however, a despreading code length the same as a length corresponding to the plurality of signals is required. A problem that arises as a result is an increase in search time, as will be described below.

For example, a method in which only one correlator is provided and the correlation operation is performed by shifting phase sequentially whenever an integrated result is obtained is referred to a "serial search". In this case the time required to investigate all spreading codes is given by the following:

$$(\text{number of spreading codes}) \times \qquad (1)$$
$$(\text{number of plurality of signals that undergo synchronous addition}) \times$$
$$(\text{integration time})$$

Accordingly, an object of the present invention is to provide a cell search circuit or method which does not invite an increase in search time, even if coherent integration is performed, and which minimizes an increase in the scale of the circuitry. Further objects will become apparent in the entire disclosure.

According to a first aspect of the present invention, there is provided a cell search circuit for CDMA. The cell search circuit has a spread signal generator having a phase shifting function, a multiplier multiplying an output of the spread signal generator by an input signal, a ring buffer accumulating results of correlation, performed a prescribed number of times, in order to perform coherent integration over a plurality of signals, and an adder. In the circuit, an accumulator is constructed by a single-signal portion of the ring buffer and the adder, integration is performed over a length of time substantially the same as unit-signal duration prior to spreading, coherent integration is performed by summing results of time integration of each signal, which results have been accumulated in the ring buffer, based upon a predetermined combination of polarities, and shifting operation of the spread signal generator having the phase shifting function is controlled based upon results of coherent integration.

According to a second aspect of the present invention, there is provided a BPSK spread spectrum CDMA system which uses the same spreading code in both an in-phase (I-phase) component and a quadrature-phase (Q-phase) component. The system is equipped with the cell search circuit as set forth in the first aspect for each of the I and Q phases, coherent integration of the ring buffer of the cell search circuit is performed at a predetermined polarity, a selector is provided for each of the I and Q phases for selecting the ring buffer of the cell search circuit, a spread signal generator having a phase shifting function is shared by the I and Q phases. Supply of spreading codes to parallel processing employs delayed output of the spread signal generator having the phase shifting function. Power detection is performed by summing squares of outputs of the selectors provided for respective ones of the I and Q phases, and influence of fading is reduced by summing power over prescribed frames.

PREFERRED EMBODIMENTS

The modes for carrying out the present invention will be described below. In a preferred embodiment of the invention, a cell search circuit for CDMA has a spread signal generator (1-1 in FIG. 1) having a phase shifting function, a multiplier (2-1 in FIG. 1) multiplying an output of the spread signal generator by an input signal, and a ring buffer (3-1 in FIG. 1) for accumulating results of correlation, performed a prescribed number of times, in order to perform coherent integration over a plurality of signals. An accumulator is constructed by a buffer for a single-signal portion of the ring buffer and an adder (4-1 in FIG. 1), integration is performed over a length of time substantially the same as the duration of a unit signal prior to spreading, and coherent integration is performed by summing results of time integration of each signal, which results have been accumulated in the ring buffer, based upon a predetermined combination of polarities. The state of spreading code synchronization or coherency is judged based upon the results of coherent integration. If the spreading codes are not in synchronization, an operation for shifting the phase of the spread signal generator having the phase shifting function is performed, thereby achieving synchronization of the spread signals.

The cell search circuit for CDMA according to an embodiment of the invention is such that the time required to examine all spreading codes is only $$(\text{number of spreading codes}) \times (\text{integration time}) \qquad (2)$$

In other words, search time is not increased even if an coherent integration function is added on.

It goes without saying that the present invention can be applied even in a case where a combination with a parallel search is used to further shorten search time.

In accordance with the CDMA search circuit according to an embodiment of the invention, S/N ratio can be increased by a factor of $M^{1/2}$ by performing coherent integration M times even when the circuit is used in CDMA communication in which the power of the interference component is larger than the power of the target signal component. This makes it possible to judge whether a synchronized state has been achieved.

Furthermore, in a case where use is made of a passive-correlating type matched filter having taps corresponding to the length of unit signal time, for example, a ring buffer having a range which is the object of coherent integration is required in each of chip units when it is attempted to perform synchronous addition. A problem that arises is that a very large ring buffer must be employed. By contrast, in an embodiment of the present invention, an advantage is that even when a parallel search and a serial search are combined, the effects thereof are not lost.

Furthermore, an embodiment of the present invention is such that even when a signal which undergoes coherent integration is modulated by a fixed pattern, it is so arranged that addition or subtraction can be controlled in conformity with the fixed pattern. This is advantageous in that coherent integration can be executed with regard to any fixed pattern.

Furthermore, in a BPSK (Binary Phase-Shift Keyed) spread spectrum CDMA system which uses the same spreading code in both an in-phase (I-phase) component and a quadrature-phase (Q-phase) component, the cell search circuit for CDMA of the present invention is characterized in that the search circuit of the above-described embodiment is provided for both the I and Q phases, coherent integration of the ring buffer is performed at a predetermined polarity, a selector is provided for selecting the output thereof, a spread signal generator having a phase shifting function is shared (common) by the I and Q phases, supply of spreading codes to parallel processing employs delayed output of the spread signal generator, power detection is performed by summing squares of outputs of the selectors for the I and Q phases, and influence of Rayleigh fading is reduced by summing power over L frames.

In accordance with the cell search circuit for CDMA of the present invention, as described above, coherent integration is performed over a plurality of signals, whereby a search can be performed while raising the S/N ratio. This holds even in CDMA, in which the power of the interference component is larger than the power of the target signal component and a desired S/N ratio cannot be achieved merely by performing integration over a length of time substantially the same as the duration of a unit signal prior to spreading. As a result, an excellent CDMA system can be realized.

Further, the time required to investigate all spreading codes with the conventional search, i.e. (number of spreading codes)×(number of plurality of signals that undergo synchronous addition)×(integration time), becomes (number of spreading codes)×(integration time) in accordance with the present invention, even when a serial search is conducted.

Furthermore, when an arrangement in which k-number of parallel processing operations are included is adopted in the present invention in order to shorten search time, the time needed to investigate all spreading codes is (number of spreading codes)×(integration time)/k. This has the effect of shortening search time greatly.

In a case where it is attempted to perform coherent integration using a matched filter having taps corresponding to unit signal length, for example, it becomes necessary to execute an enormous amount of processing wherein a very large ring buffer having a range which is the object of coherent integration in chip units and is necessary and power summing must be carried out in chip units. In accordance with the present invention, however, this can be realized without losing the effects thereof even when a parallel search and a serial search are combined. As a result, the invention is advantageous in that the ratio of parallel to serial can be changed in dependence upon the load and can be optimized in conformity with the load.

Further, in accordance with the present invention, even when a signal which undergoes coherent integration is modulated by a certain determined pattern, polarity can be controlled in conformity with the pattern. This is advantageous in that a search can be executed with regard to any pattern.

DETAILED DESCRIPTION OF THE EMBODIMENTS

The embodiments of the invention set forth above will now be described in greater detail with reference to the drawings.

Figure 1:
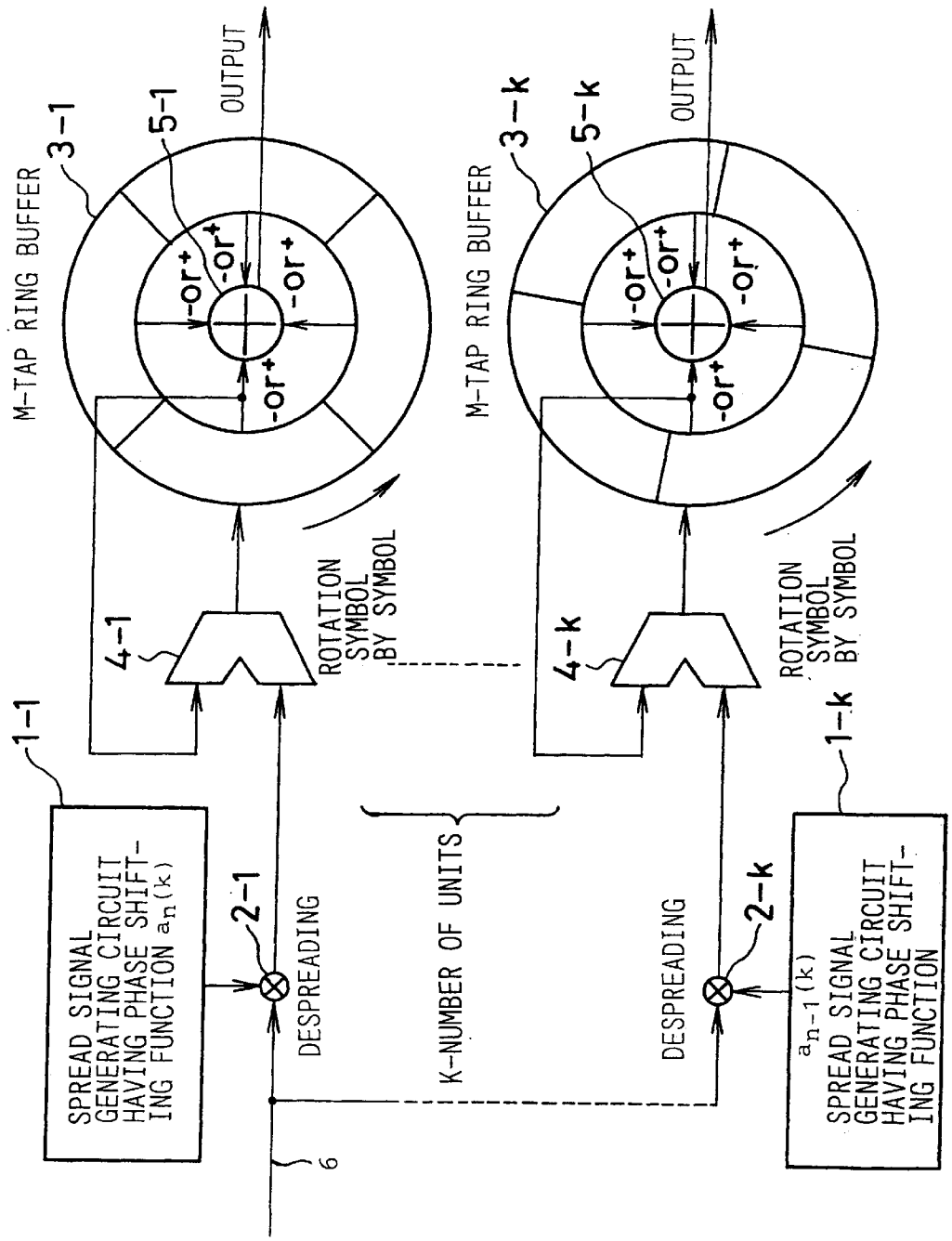
FIG. 1 is a block diagram illustrating the construction of the principal components of a search circuit for CDMA and is useful in describing a first embodiment of the present invention.

FIG. 1 is a block diagram illustrating the construction of the principal components of a search circuit employed in a CDMA communication system according to the present invention and is useful in describing a first embodiment of the invention.

As shown in FIG. 1, in this embodiment, a spread signal generator 1-1 having the phase shifting function generates a spreading code an(k) that is multiplied in a multiplier 2-1 by a received signal 6, which is the result of an A/D (analog-to-digital) conversion. Despreading is thus carried out.

The results of multiplication are accumulated in an accumulator constructed by an adder 4-1 and a single-signal portion (buffer) of the ring buffer 3-1. As a result, a function for performing integration over a period of time substantially the same as the duration of a unit signal prior to spreading is implemented. It should be noted that the accumulator constructed by the buffer and adder 4-1 performs accumulation in chip units over a period of time equivalent to one symbol.

Since the signal prior to spreading does not change during the interval of a unit signal, the despread result of time integration is a value obtained by integrating, with respect to time, the signal which prevails prior to spreading.

Figure 2:
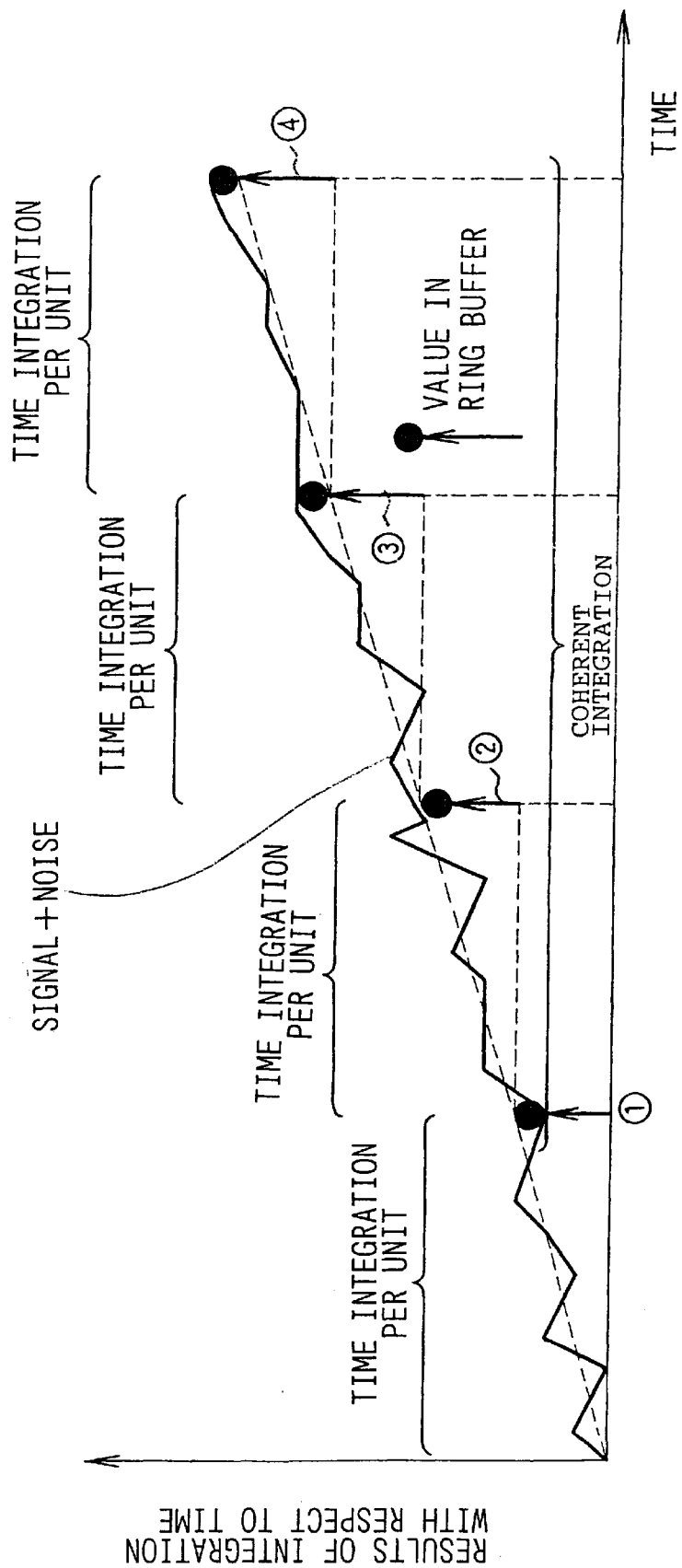
FIG. 2 is a diagram showing integration time per unit signal and signal status due to coherent integration and is useful in describing the first embodiment of the present invention.

If this is expressed by a timing chart, the result will be as shown at the beginning of the timing chart of FIG. 2.

In FIG. 2, time integration per unit signal accumulates with time. Though a noise component also is integrated, the increase in the noise component is smaller than the increase in the signal component owing to statistical independence, and the S/N ratio is improved correspondingly.

With reference again to FIG. 1, an operation for performing time integration over the unit signals is carried out also with regard to the next signal in a manner similar to that described above. At this time, however, the ring buffer 3-1 is rotated so that the results of integration are accumulated in a new buffer.

This operation is carried out in similar fashion with regard to M-number of buffers in the ring buffer 3-1. When the final integrating operation is completed, the contents of each buffer of the ring buffer 3-1 are summed by an adder 5-1, shown at the center of the ring buffer 3-1, based upon a predetermined combination of polarities (+, −).

The resulting sum takes on a maximum value when the pattern of M signals prior to spreading and the pattern of the combination of polarities match.

The state of time integration when matching has been achieved is shown in FIG. 2. The portions (1) to (4) indicated by the black circles and arrows in FIG. 2 indicate the results of integration that have been accumulated in the ring buffer. FIG. 2 shows that the S/N ratio is improved by performing addition M-number of times.

The manner in which the S/N ratio is improved by performing addition M times is indicated quantitatively by a calculation formula.

First, if we let the noise components accumulated in each of the buffers be represented by $X_1, X_2, \ldots X_M$, the power of the results of addition is given by the following equation owing to statistical independence:

$$E[\{X_1 + X_2 + \ldots + X_M\}^2] = E[X_1^2 + X_2^2 + \ldots + X_M^2] \quad (3)$$

$$= M\, E[X_2]$$

Here the probability variables $X_1, X_2, \ldots X_M$ have the same probability distribution and are represented collectively by X.

The power of the results of summing a signal S is $M^2 S^2$. When this is converted to a level, therefore, the signal component is increased by a factor of M and the noise component by a factor of $M^{1/2}$ owing to summing performed M times. The S/N ratio is increased by a factor of $M^{1/2}$. It will thus be appreciated that the S/N ratio is improved.

In the case of CDMA communication technique, the noise component is relatively large in comparison with the signal component and the desired S/N ratio cannot be attained merely by performing integration for a period of time substantially identical with the duration of the unit signal prior to spreading. However, if the above-described method is adopted, the S/N ratio can be increased by a factor of $M^{1/2}$ and it is possible to make a judgment for the purpose of synchronizing spread signals.

Operation for synchronizing spreading codes based upon the results of determination will be described next.

FIG. 1 illustrates an arrangement in which a serial search and a parallel search are mixed with k-number of parallel blocks in order to shorten search time.

Though a kth block arranged in parallel is illustrated in FIG. 1, one search circuit is constructed by arraying k-number of the same arrangements. Spread signal generating circuits 1-1 to 1-k having the phase shifting function each perform a fixed phase shift. This is accompanied by a shift in the addition starting position with respect to the unit signals of ring buffers 3-1 to 3-k.

Figure 3:
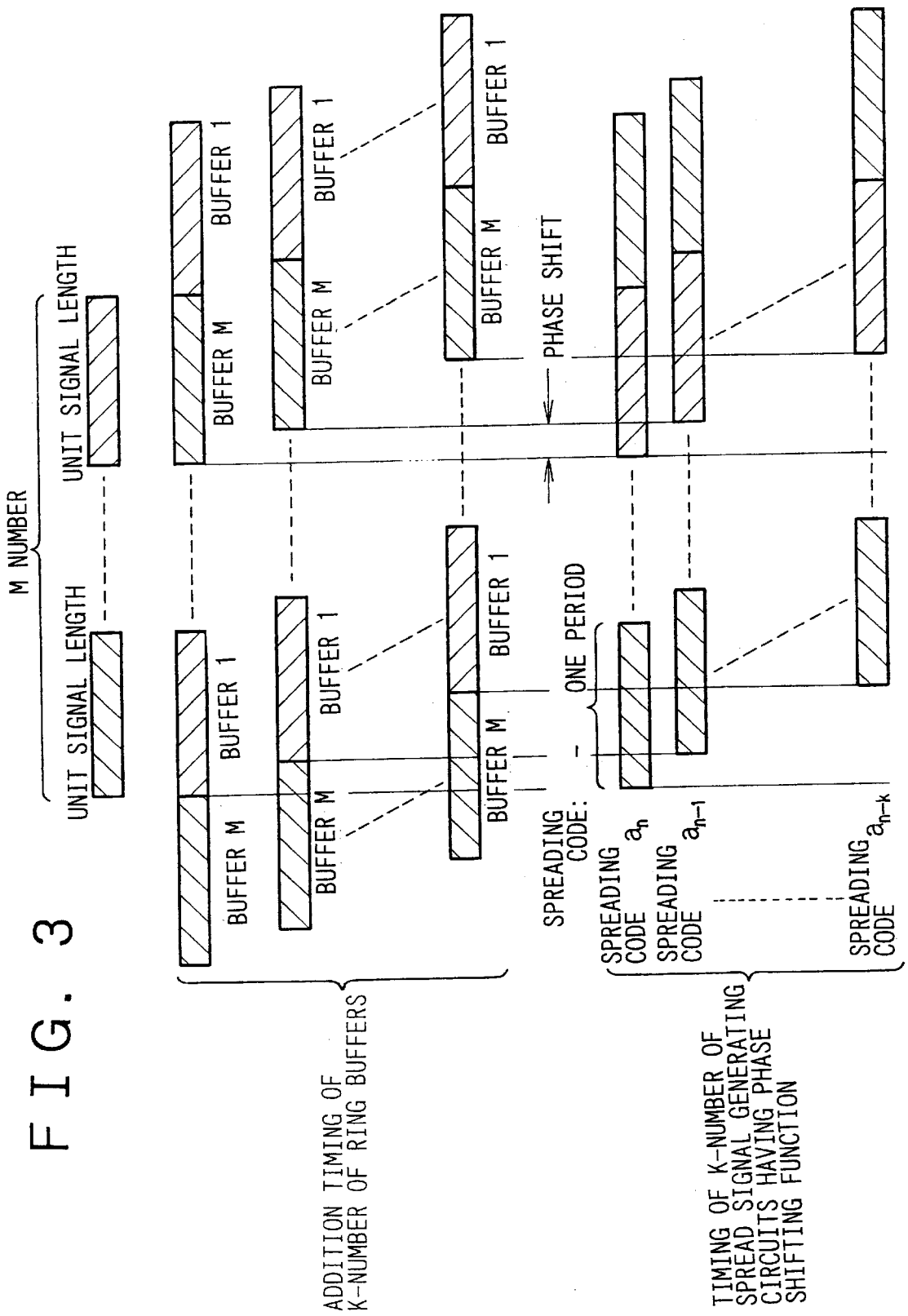
FIG. 3 is a diagram showing ring buffer addition timing and spread signal generation time in the first embodiment of the present invention.
Figure 4:
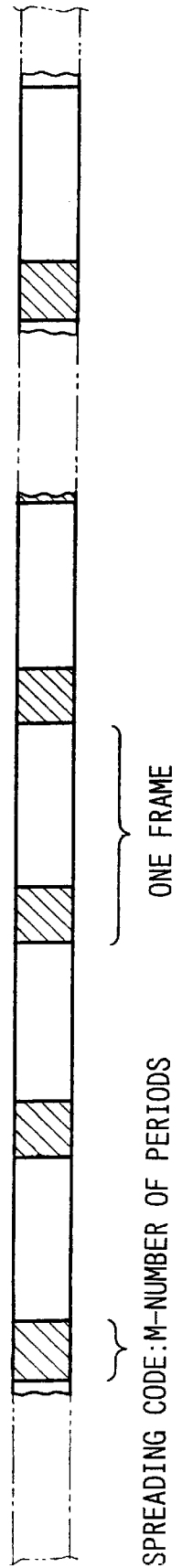
FIG. 4 is a diagram showing the overall structure of a frame and is useful in describing the first embodiment of the present invention.

FIG. 3 illustrates the relationship between the addition timing of the k-number of ring buffers 3-1 to 3-k and the phase shifts of the spread signal generating circuits 1-1 to 1-k having the phase shifting function.

The frame structure of a received signal for cell search used in this embodiment is such that an M-period portion of spreading codes is included for every frame. The phase timing of the k-number of spread signal generating circuits 1-1 to 1-k and ring buffers 3-1 to 3-k is shifted by k (see FIG. 3) at one-frame intervals, and all phase states can be investigated N/k times, where N represents the period of the spreading code.

With regard to the phase shift relationship between the k-number of spread signal generating circuits 1-1 to 1-k and ring buffers 3-1 to 3-k, in order to lighten the load of absolute-value processing or multiplication processing for envelope detection processing that follows the output shown in FIG. 1, the amount of phase shift is increased and the amount of shift at the intervals of the frame period is reduced.

As a result, a time difference develops in the timing of the outputs from the ring buffers 3-1 to 3-k and the flow of the signals is uniformalized.

Alternatively, in a case where the average load of processing is large, the number k of parallel blocks is reduced and the number of times the serial search is performed is increased, thereby making it possible to lighten the load.

It goes without saying that a variety of variations can be made at the time of design in dependence upon the distribution of the load of each portion.

The present invention covers these variations and has the advantage of making possible coherent integration.

Figure 5:
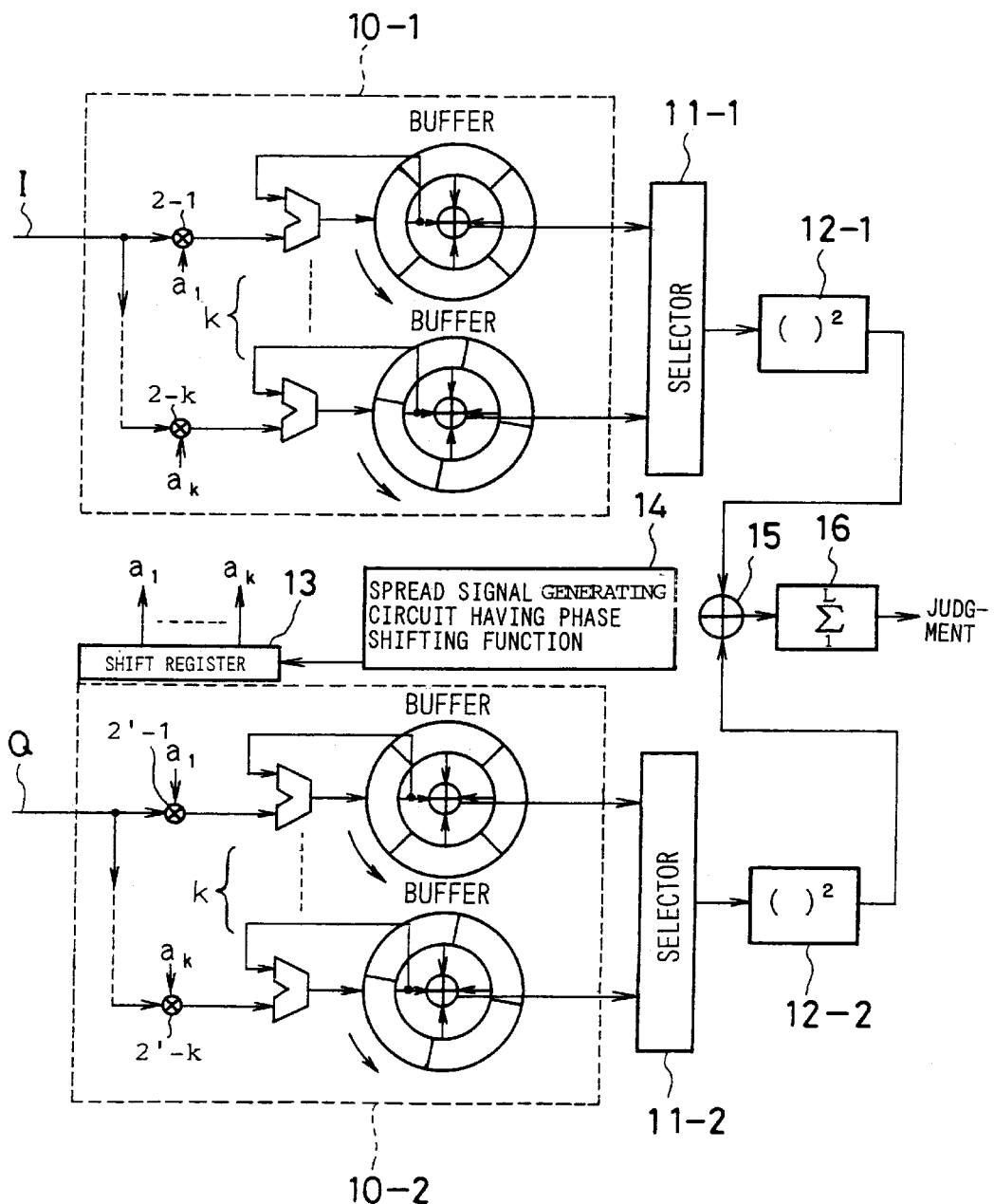
FIG. 5 is a block diagram illustrating the construction of a cell search circuit in a case applied to quadrature demodulator and is useful in describing a second embodiment of the present invention.

FIG. 5, which is a view illustrating the construction of a second embodiment of the present invention, is a block diagram illustrating overall construction in a case where the cell search circuit for CDMA according to the present invention is applied to orthogonal detection.

In FIG. 5, numerals 10-1, 10-2 denote cell search circuits identical with those of the first embodiment described with reference to FIG. 1.

Selectors 11-1, 11-2, whose inputs are the outputs of the cell search circuits 10-1, 10-2, are for selecting the sum outputs of the k ring buffers of each of the cell search circuits 10-1, 10-2. The selection is made when each ring buffer becomes full at the timing shown in FIG. 3.

If (phase shift in unit signal length)+(amount of phase shift of unit symbol length)

with respect to the k-number of ring buffers is applied to the timing of each ring buffer addition and to the spreading code at this time, then this will be useful in dispersing the load of processing from the selectors onward.

Multipliers 12-1, 12-2 and an adder 15 are for calculating the sum of the squares of each of I and Q and detecting power.

A shift register 13 and a spread signal generating circuit 14 having a phase shifting function are for supplying multipliers 2-1, ... 2-k, 2'-1, ... 2'-k in the cell search circuits 10-1, 10-2 with spreading codes for the purpose of despreading. In the case of this embodiment, BPSK spreading, which uses spreading codes common to the I and Q systems, is employed, and therefore the spreading codes a1 to ak from the shift register 13 are shared common.

Further, since a1 to ak are obtained merely by phase-shifting the same code, they are supplied by changing phase by means of the shift register.

Thus, after M coherent integrations are performed, the signal converted to power by summing the squares of I and Q is subjected to power summing over L frames by an L-frame power adder 16, whereby the influence of Rayleigh fading is reduced.

It goes without saying that an absolute-value circuit may be used instead of power conversion at this time to reduce the scale of the circuitry.

As many apparently widely different embodiments of the present invention can be made without departing from the spirit and scope thereof, it is to be understood that the invention is not limited to the specific embodiments thereof except as defined in the appended claims.

What is claimed is:

1. A cell search circuit for CDMA comprising:

a spread signal generator having a phase shifting function;

a multiplier multiplying an output of said spread signal generator by an input signal;

a ring buffer accumulating results of correlation, performed a prescribed number of times, in order to perform in-phase addition over a plurality of signals; and an adder;

wherein an accumulator is constructed by a single-signal portion of said ring buffer and said adder and integration is performed over a length of time substantially the same as unit-signal duration prior to spreading;

coherent integration is performed by summing results of time integration of each signal, which results have been accumulated in said ring buffer, based upon a predetermined combination of polarities; and shifting operation of said spread signal generator having the phase shifting function is controlled based upon results of the coherent integration.

2. A cell search circuit for CDMA, wherein a prescribed number of the cell search circuits, which comprise said spread signal generator, said ring buffer and said adder as set forth in claim 1, are provided in parallel with respect to the input signal.

3. A cell search circuit for CDMA according to claim 1, wherein the state of spreading code synchronization is judged based upon the results of coherent integration and, in a case where the spreading codes are not in synchronization, an operation for shifting the phase of said spread signal generator is performed, thereby achieving synchronization of the spread signals.

4. In a BPSK spread spectrum CDMA system which uses the same spreading code in both an in-phase (I-phase) component and a quadrature-phase (Q-phase) component, a cell search circuit for CDMA wherein:

the system is equipped with said cell search circuit as set forth in claim 1 for each of the I and Q phases;

coherent integration of the ring buffer of said cell search circuit is performed at a predetermined polarity;

a selector is provided for each of the I and Q phases for selecting the ring buffer of said cell search circuit;

a spread signal generator having a phase shifting function is shared by the I and Q phases;

supply of spreading codes to parallel processing employs delayed output of said spread signal generator having the phase shifting function;

power detection is performed by summing squares of outputs of said selectors provided for respective ones of the I and Q phases; and influence of fading is reduced by summing power over prescribed frames.

5. A cell search circuit for CDMA, comprising:

a spread signal generator having a phase shifting function;

a multiplier multiplying an output of said spread signal generator by an input signal; and a ring buffer comprising a plurality of buffers for accumulating results of correlation, performed a prescribed number of times, in order to perform coherent integration over a plurality of signals, buffer position being shifted every signal (symbol) under a final stage returns to an initial stage;

wherein an accumulator is constructed by a buffer for a single-signal portion in said ring buffer and an adder receiving output of said multiplier, and accumulation is performed, in chip units, over the duration of a unit signal prior to spreading;

coherent integration is performed by summing results of time integration of each signal portion, which results have been accumulated in said buffers, respectively, based upon a predetermined combination of polarities; and shifting operation of said spread signal generator having the phase shifting function is controlled based upon results of coherent integration.

* * * * *